United States Patent [19]
McKernan et al.

[11] Patent Number: 5,193,660
[45] Date of Patent: Mar. 16, 1993

[54] EXTENSIBLE CONVEYORS

[76] Inventors: Gary M. McKernan; Robert J. Tucker, both of P.O. Box 2288, Regency Park, Australia, 5942

[21] Appl. No.: 810,488

[22] Filed: Dec. 19, 1991

[51] Int. Cl.$^5$ ............................................. B65G 15/26
[52] U.S. Cl. .................................... 198/594; 198/812
[58] Field of Search ............... 198/812, 594, 595, 588, 198/861.1

[56] References Cited

U.S. PATENT DOCUMENTS

| | | | |
|---|---|---|---|
| 3,613,866 | 10/1971 | Arndt | 198/812 |
| 4,474,287 | 10/1984 | Thompson | 198/812 |
| 4,643,299 | 2/1987 | Calundan | 198/812 |
| 4,860,878 | 8/1989 | Mraz et al. | 198/812 X |

Primary Examiner—D. Glenn Dayoan
Assistant Examiner—Cheryl L. Gastineau
Attorney, Agent, or Firm—Lipton, Famiglio & Stapler

[57] ABSTRACT

An extensible flat belt conveyor has a fixed section (1) and at least two extension sections (2) and (3). A chain (18) is carried over sprockets (21) and (22) on the portion (2) adjacent the fixed section (1), and its lower traverse is fastened to the fixed section while its upper traverse is fastened to the movable section (3). When a chain sprocket (22) is driven the movable section (3) travels twice as far and as fast as the section (2). A control module (25) is carried on the extending end of movable section (3), and is wired back to the fixed section (1) by an electrical cable (30) which extends through saddles (28) outstanding from the chain (18).

4 Claims, 2 Drawing Sheets

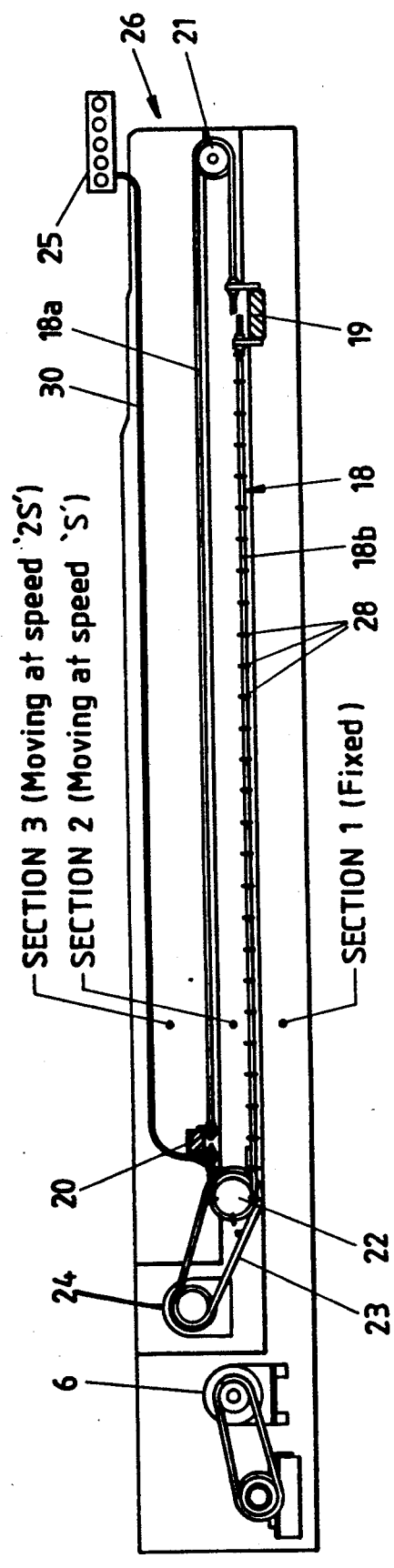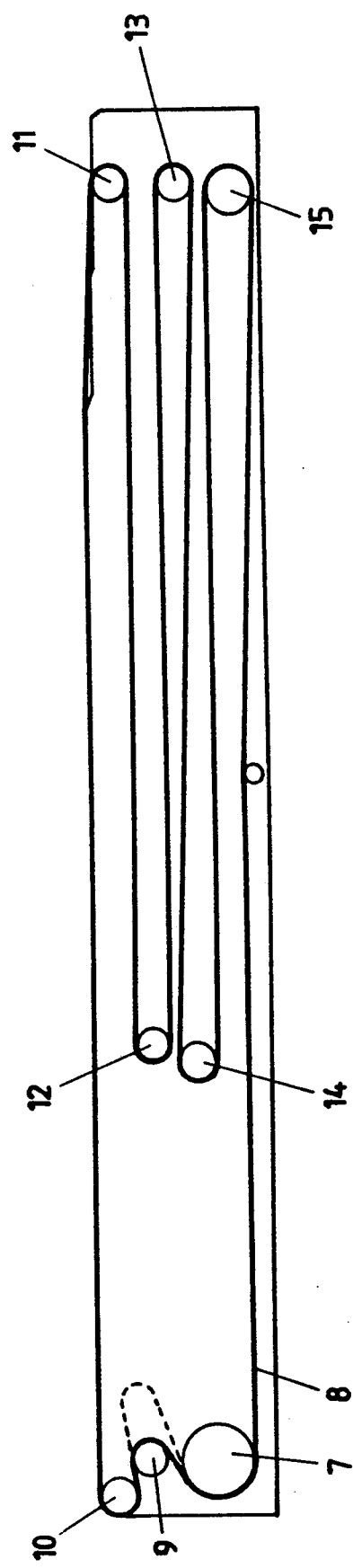

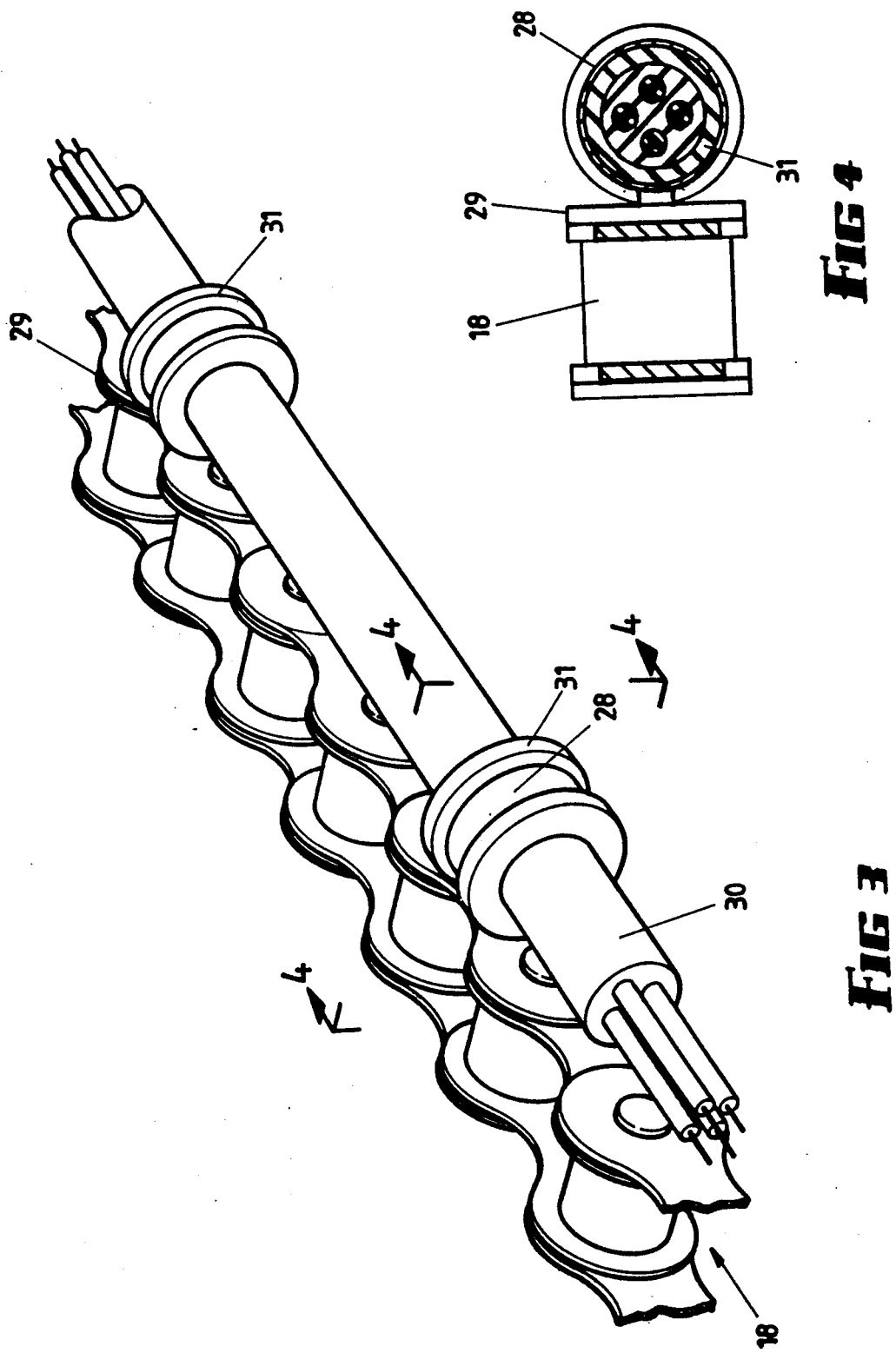

EXTENSIBLE CONVEYORS

This invention relates to improvements in extensible conveyors of the type having extension sections which are relatively movable and movable over a fixed section, and which are sometimes used to penetrate a large mobile transport, to assist in unloading the contents.

Extensible conveyors are in common use and typically comprise a plurality of sections, perhaps three sections, and as the third section is extended from the first a conveyor belt is taken out with a third section, the conveyor belt extending over a plurality of take-up rollers which maintain tension in the belt whether the conveyor is extended or retracted.

The usual arrangement for driving such conveyors is by a pair of longitudinally extending chains which flank the second section and extend over pulleys extending outwardly from the second section, out of the pulleys being driven by power means also carried on the second section. The bottom traverse of each chain is fixed to the first section, which may be regarded as a fixed frame, and the top traverse is fixed to the third section. Thus as the driven sprocket rotates in an extension mode, the second section moves over the stationary bottom traverse of the chain at a speed "S", and the third section moves at a speed "2S", carrying with it the top traverse of the conveyor belt. The number of sections can be reduced or increased.

It is very desirable that the extending end be provided with the control means for extension or retraction of the conveyor, and in many instances it is also provided with lights for illuminating the interior of a vehicle body to assist an operator in unloading of the vehicle.

Heretofore the power has been delivered to the extended end by means of a flexible cable which is carried on a drum at the fixed end, the drum unwinding or rewinding as required. The drum normally contains slip rings so that it can rotate and yet deliver the required degree of power to the extending end of the conveyor, but the first cost is quite high and the drum is a source of maintenance problems, both with respect to the slip rings and also with respect to the amount of dissipated energy in the coiled cable within it, which can cause heating and consequential deterioration of the flexible cable.

The main object of this invention is to provide a simple and inexpensive means for transmitting the power from a fixed end of the conveyor to the extended end, and in one embodiment of the invention there are provided a plurality of saddles carried by an operating chain, and the saddles guide and retain the cable with respect to the chain, or to the chains if more than three sections are used.

With this arrangement, the cost of the drum is avoided, and the arrangement is satisfactory from a flexure point of view in that the sprockets are usually of sufficient diameter to easily accommodate the flexure of the cable as it negotiates a sprocket along with a chain to which it is saddled.

An embodiment of the invention is described hereunder in some detail with reference to and as illustrated in the accompanying drawings in which:

FIG. 1 is a diagrammatic side view of an extensible conveyor having a fixed section, a second section which is movable over the fixed section and a third section which is movable over the second section, FIG. 2 is a diagrammatic representation of a belt path of a conveyor belt, FIG. 3 is a fragmentary perspective view drawn to a large scale showing the manner in which a power cable is coupled to an extension chain and FIG. 4 is a section taken on the plain 4 4 4 of FIG. 3.

In this embodiment an extensible conveyor comprises a fixed section 1, a first moving section 2 and second moving section 3, so that there are three sections in all. Guide means are provided for guiding relative movement between the sections 2 and 3, and for guiding the section 2 for movement over the fixed section 1.

The fixed section 1 carries a driving motor 6 which drives a belt drive pulley 7 (FIG. 2) the belt drive pulley 7 driving a flat conveyor belt 8 which extends over a take-up pulley 9 and over guide pulleys designated 10, 11, 12, 13, 14 and 15. The guide pulley 15 is rotatable about bearings which are carried on the fixed section 1 (not herein illustrated) the pulleys 13 and 14 are carried on the movable section 2 (which moves at a speed "S") and the pulleys 11 and 12 are carried in bearings on the movable section 3 (moving at a speed "2S"). To effect the extension of sections 2 and 3, use is made of an extension chain 18 which comprises two portions 18a and 18b which are joined respectively at their ends by securing members 19 and 20. The securing member 19 is fixed with respect to section 1 and the securing member 20 is fixed with respect to section 3, while the sprockets 21 and 22 which are traversed by the respective portions 18a and 18b of the extension chain, are carried by section 2. The sprocket 22 is itself driven by a driving chain 23 which derives its power from an electric motor 24, and the whole chain drive assembly is carried on the first moving section 2. The securing member 20 is secured to section 3 via means which are not herein illustrated.

Heretofore, the description of the embodiment has been substantially in accordance with known art, but the invention is concerned with transmitting power from the fixed first section to a control module 25 on the extending end 26 of the third moving section which moves at the speed 2S.

This is achieved by providing the chain 18 with a plurality of outstanding saddles 28 which are washers, or short tubular saddles welded to respective outer links 29 of extension chain 18. The electrical cable 30 is shown as having four cores but can be of a different capacity, and to reduce the danger of chaffing there are provided resilient grommets 31 which extend through the saddles 28 and so spread the load imposed by bending of the cable as it traverses the periphery of sprocket 22 that the danger of damage is largely reduced.

One end of the cable extends from the chain at the location of securing member 19 which remains stationary and the other end at the securing member 20 which does not move with respect to the control module 25.

With this arrangement, the difficulties and cost associated with the previously used drums are largely avoided, and the whole arrangement is found to be very simple and effective. The cable can be expected to outlast a cable maintained in a drum if the drum does not sufficiently vent the cable to keep it cool. Any damage is more readily identified and more easily repaired.

We claim:

1. An extensible conveyor of the type having extension sections which are relatively movable and also movable in respect to a fixed section, and wherein there is a need to provide electrical power to an extension section, having a chain carried by spaced sprockets on a movable extension section, a plurality of saddles carried by respective links of the chain and extending laterally outwardly from the chain, and an electrical power cable carried alongside the chain by the saddles.

2. An extensible conveyor according to claim 1 wherein each said saddle comprises a washer or tube of short length welded to an outer surface of a respective chain link.

3. An extensible conveyor according to claim 1 further comprising a respective grommet contained in each said saddle.

4. An extensible conveyor according to claim 1 wherein there are at least two said relatively movable sections, said chain and sprockets being on a said movable section adjacent a fixed section, having two securing members spaced from each other along the chain, one said securing member being fast with said fixed section and with one traverse of the chain and the other securing member being fast with an adjacent said movable section and an opposite said traverse of the chain.

* * * * *